(No Model.)
T. SETTLE.
SAFETY DEVICE FOR ELEVATORS.
No. 497,433. Patented May 16, 1893.
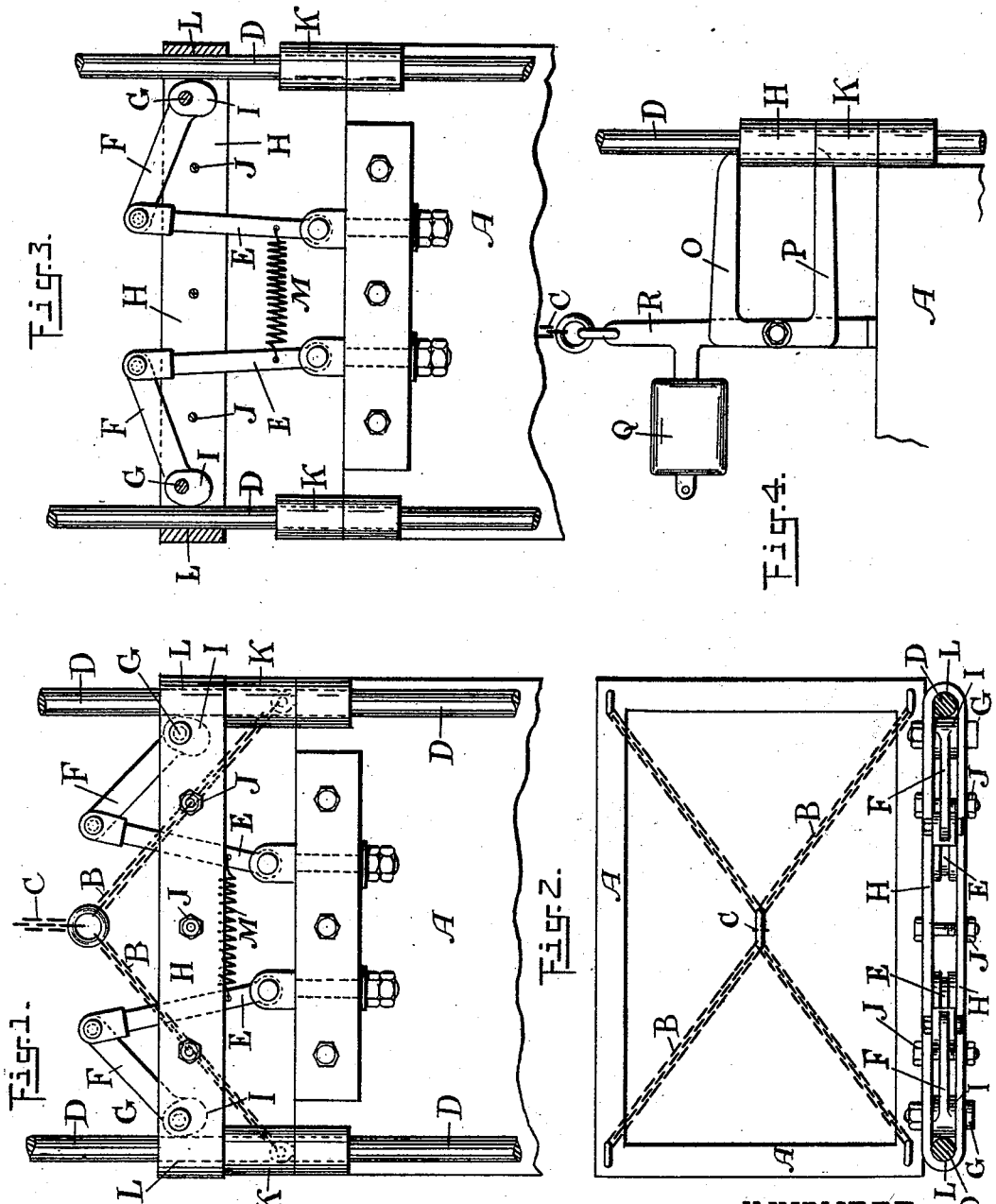
WITNESSES:
Arthur B Crossley.
William H. Tempest.
INVENTOR:
Tom Settle
By Herbert W. T. Jenner, attorney.

UNITED STATES PATENT OFFICE.

TOM SETTLE, OF HUDDERSFIELD, ENGLAND.

SAFETY-DEVICE FOR ELEVATORS.

SPECIFICATION forming part of Letters Patent No. 497,433, dated May 16, 1893.

Application filed January 10, 1893. Serial No. 457,908. (No model.) Patented in England April 20, 1892, No. 7,439.

*To all whom it may concern:*

Be it known that I, TOM SETTLE, a subject of the Queen of Great Britain, residing at Huddersfield, in the county of York, England, have invented certain new and useful Improvements in Safety Devices for Elevators, (for which I have obtained a patent in England, No. 7,439, dated April 20, 1892;) and I do hereby declare the following to be a full, clear, and exact description of the invention, such as will enable others skilled in the art to which it appertains to make and use the same.

This invention is designed to prevent accidents to the cages in mines and hoists on the breakage of the winding rope or chain.

Such being the nature and object of my invention, I will now make reference to the accompanying sheet of drawings illustrative thereof, wherein—

Figure 1 is a side elevation of my improved apparatus, and Fig. 2 is a plan view of same. Fig. 3 is also an elevation, showing the device in operation. Fig. 4 is a side view of a trip, for use in connection with the apparatus.

A represents a portion of a cage suspended by chains B and winding chain C. The cage is free to slide up and down the vertical rods D in the ordinary and well known manner. To the top of the cage are hinged vertical rods or links E, to each of which links are hinged arms F capable of oscillating upon fulcrums G, on an independent frame H, so as to cause the cams or eccentrics I to be forced or otherwise pressed against the vertical guide rods D for the purpose of binding the said guide rods between the cams and the inner side of the frame or plates H, which plates are bound together by bolts J for the purpose of being made strong and rigid. When the cage is suspended by the winding chain and the apparatus intact, the parts occupy the positions shown in Fig. 1 where the cams I are clear and away from the guide rods D and the frame H resting upon the bosses or collars K on the top of the cage; but if the chain or rope breaks while the cage is either ascending or descending, the cage commences to separate from the frame H causing the weight of the cage to be thrown upon the fulcrums G, whereby the rods E would be made to assume a vertical position as shown in Fig. 3, forcing the eccentrics I with great power against the vertical rods D, which become locked between the eccentrics and the part L of the frame H, whereby the cage would be arrested and brought to a standstill. A spiral spring M assists in drawing the rods E into a vertical position.

Where railway rails are employed instead of vertical rods for steadying the cage in its upward and downward movement the frame H is left open at both ends.

In Fig. 4 I have shown an arrangement of mechanism to be used in conjunction with my improved apparatus—if preferred. This mechanism consists of two jaws O and P, the upper one of which, when the cage is suspended rests upon the top of the frame H but when the chain or rope breaks, the weight Q draws the hinged arm R down sharply and forces the lower jaw against the under side of the frame H which is suddenly kicked or slightly raised and so assists the frame H to leave the bosses K and to quicken the movement of the rods E which operate the eccentrics. Instead of using the weight Q for drawing down the hinged arm R, I may employ a spiral spring, or if desirable the spring may be used in conjunction with the weight.

I claim as my invention—

The combination, with the guides, of the sliding cage, the frame inclosing the guides and provided with stiffening bolts, the levers pivoted between the sides of the frame and provided with eccentrics adapted to press the guides against the ends of the frame, and the rods pivotally connecting the ends of the said levers with the cage, substantially as and for the purpose set forth.

In testimony whereof I affix my signature in presence of two witnesses.

TOM SETTLE.

Witnesses:
 GEORGE B. NALDER,
 THOMAS H. BARRON,
  *Market Place, Huddersfield.*